United States Patent
Tian et al.

(10) Patent No.: US 11,754,281 B2
(45) Date of Patent: Sep. 12, 2023

(54) TEST LOOP FOR SIMULATING STEAM GENERATOR WITH OR WITHOUT AXIAL ECONOMIZER AND TEST METHOD THEREOF

(71) Applicant: Xi'an Jiaotong University, Shaanxi (CN)

(72) Inventors: Wenxi Tian, Shaanxi (CN); Chunjie Zeng, Shannxi (CN); Mingjun Wang, Shaanxi (CN); Yingjie Wang, Shaani (CN); Suizheng Qiu, Shaanxi (CN); Guanghui Su, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 17/646,201

(22) Filed: Dec. 28, 2021

(65) Prior Publication Data

US 2022/0205630 A1 Jun. 30, 2022

(30) Foreign Application Priority Data

Dec. 30, 2020 (CN) .......................... 202011628000.8

(51) Int. Cl.
*F22B 37/42* (2006.01)
*F22B 1/28* (2006.01)
(Continued)

(52) U.S. Cl.
CPC ............ *F22B 37/423* (2013.01); *F22B 1/282* (2013.01); *F22B 35/08* (2013.01); *F22B 37/12* (2013.01);
(Continued)

(58) Field of Classification Search
CPC ...... F22B 37/423; F22B 37/426; F22B 37/12; F22B 1/282; F22B 35/08; G01M 99/002
(Continued)

(56) References Cited

FOREIGN PATENT DOCUMENTS

CN 102629110 A * 8/2012
CN 103822792 A * 5/2014
(Continued)

OTHER PUBLICATIONS

CN 108565034 B—Translation (Year: 2019).*
CN 207637503 U—Translation (Year: 2018).*
CN 106257264 A—Translation (Year: 2016).*

*Primary Examiner* — Steven B McAllister
*Assistant Examiner* — Benjamin W Johnson
(74) *Attorney, Agent, or Firm* — McDonnell Boehnen Hulbert & Berghoff LLP

(57) ABSTRACT

Disclosed are a test loop for simulating a steam generator with or without an axial economizer and a test method thereof. The loop includes a cooling water loop, a water supply loop, a recirculated water loop and a power supply. The cooling water loop is used for condensing and cooling wet steam and providing the wet steam to the water supply loop and the recirculated water loop. The water supply loop is used for providing cold-state water supply for a test device, the recirculated water loop is used for reheating cooled water to be saturated and providing the water to the test device. The power supply is used for supplying power to heating equipment and an electric heater in the test device. The present disclosure provides a test method of the loop. Simulation tests can be carried out on a steam generator with or without an axial economizer.

12 Claims, 2 Drawing Sheets

(51) Int. Cl.
    *F22B 35/08*     (2006.01)
    *F22B 37/12*     (2006.01)
    *F22B 35/18*     (2006.01)
    *G01M 99/00*     (2011.01)
(52) U.S. Cl.
    CPC ............ *F22B 37/426* (2013.01); *F22B 35/18* (2013.01); *G01M 99/002* (2013.01)
(58) Field of Classification Search
    USPC ........................................................ 122/4 A
    See application file for complete search history.

(56) References Cited

FOREIGN PATENT DOCUMENTS

| | | | | | |
|---|---|---|---|---|---|
| CN | 106257264 | A | * | 12/2016 | .......... G01M 99/002 |
| CN | 207439695 | U | * | 6/2018 | |
| CN | 207637503 | U | * | 7/2018 | |
| CN | 108565034 | B | * | 2/2019 | ............. G21C 17/00 |
| KR | 2010085465 | A | * | 7/2010 | |

\* cited by examiner

TEST LOOP FOR SIMULATING STEAM GENERATOR WITH OR WITHOUT AXIAL ECONOMIZER AND TEST METHOD THEREOF

CROSS REFERENCE TO RELATED APPLICATION

This patent application claims the benefit and priority of Chinese Patent Application No. 202011628000.8 filed on Dec. 30, 2020, the disclosure of which is incorporated by reference herein in its entirety as part of the present application.

TECHNICAL FIELD

The present disclosure relates to the technical field of primary and secondary side heat transfer enhancement in steam generators, and specifically relates to a test loop for simulating a steam generator with or without an axial economizer and a test method thereof.

BACKGROUND ART

For a vertical natural circulation steam generator of a nuclear power station, the improvement of primary and secondary side heat transfer efficiency in the steam generator is greatly helpful for improving the operation efficiency of the nuclear power station and reducing the nuclear power cost. An axial economizer is installed in the steam generator, so that secondary side fluids (feedwater and recirculated water) on the cold side and the hot side can relatively independently flow and transfer heat in areas from a downcomer channel below a water supply pipeline to a tube bundle area in front of the top of a central divider plate, so that heat transfer is enhanced by increasing the temperature difference between primary and secondary side fluids of a cold side heat transfer tube and the length of a cold side preheating area.

At present, due to less experimental research on the axial economizer, the research on the distribution proportion of the optimal feedwater supply and the recirculated water needs to be carried out, and a related simulation test loop is lacked.

The Chinese Application with number of 201610809983.2 discloses a test loop with an axial economizer steam generator. The test loop is too complex in design from the perspective of researching the heat transfer effect enhancement of the axial economizer on the steam generator. The simulation of the cold side and the hot side of the U-shaped pipe of the steam generator is achieved by adopting an additional hot fluid loop, the complexity of the loop is undoubtedly increased, the construction cost is increased. From the perspective of simulation, electric heating rod bundles with different heat fluxes can be completely adopted to realize the simulation, which simplifies the test loop and improves the operability; from the test flow, the operation is tedious and adopts expensive equipment, namely a canned motor pump; the steam generator is slightly simplified in the test section, so that the test section is complex in structure, a bundle wrapper, a double wrapper and an isolation plate need to be dismantled at the same time when a test without an axial economizer is carried out, and in consideration of the size and weight of the test section, this process is extremely time-consuming and labor-consuming, which is not beneficial to carry out a comparison test rapidly.

SUMMARY

In order to solve the problems in the prior art, the present disclosure provides a test loop for simulating a steam generator with or without an axial economizer and a test method thereof, the test loop and the test method are used with a steam generator test device with a detachable axial economizer, and the loop simultaneously meets the requirements of carrying out comparison tests under various working conditions for a steam generator with an axial economizer and a steam generator without an axial economizer.

In order to achieve the above purpose, the present disclosure adopts the following technical scheme.

A test loop for simulating a steam generator with or without an axial economizer includes a cooling water loop 110, a water supply loop 120, a recirculated water loop 130 and a power supply 3. The cooling water loop 110 is used for condensing and cooling wet steam and providing the wet steam to the water supply loop 120 and the recirculated water loop 130. The water supply loop 120 is configured for providing cold-state water for a test device 10 for simulating a steam generator with or without an axial economizer. The recirculated water loop 130 is configured for reheating cooled water to be saturated and providing the cooled water heated, to the test device 10. The power supply 3 is configured for supplying power to heating equipment and an electric heater 2 in the test device 10, and the heating equipment in the test device 10 includes non-uniform heat flux electric heating rods which are divided into a left group and a right group and configured for simulating a hot side and a cold side of a U-shaped tube bundle in the steam generator.

The cooling water loop 110 includes a second water tank 4, a cooling tower 5, a condenser 6, a second regulating valve 202, a third regulating valve 203 and a first circulating pump 301. An outlet of the second water tank 4 communicates with the first circulating pump 301, an outlet of the first circulating pump 301 communicates with a pipe side inlet of the condenser 6. A pipeline communicated with the circulating pump 301 and the condenser 6 is provided with the second regulating valve 202, a pipe side outlet of the condenser 6 communicates with an inlet of the cooling tower 5, and an outlet of the cooling tower 5 communicates with an inlet of the second water tank 4.

The water supply loop 120 includes a wet steam outlet 8, a condenser 6, a first water tank 1, a test section first inlet 7, a first regulating valve 201, a third regulating valve 203, a fourth regulating valve 204, a fifth regulating valve 205, a second circulating pump 302 and a third circulating pump 303. A shell side outlet of the condenser 6 communicates with the second circulating pump 302, an outlet of the second circulating pump 302 communicates with an inlet of the first water tank 1. A pipeline communicated with the second circulating pump 302 and the first water tank 1 is provided with the first regulating valve 201, an outlet of the first water tank 1 communicates with the third circulating pump 303. An outlet of the third circulating pump 303 communicates with the test section first inlet 7 of the test device 10. A pipeline communicated with the third circulating pump 303 and the test section first inlet 7 is sequentially provided with a fifth regulating valve 205, a first thermometer 601, a first pressure meter 501 and a second flow meter 402. The wet steam outlet 8 in a top of the test device 10 communicates with a shell side inlet of the condenser 6, and a pipeline communicated with the wet steam outlet 8 and the condenser 6 is provided with a third thermometer 603 and a third pressure meter 503.

The recirculated water loop 130 includes a wet steam outlet 8, a condenser 6, an electric heater 2, a test section second inlet 9, a seventh regulating valve 207 and a second circulating pump 302. A pipeline between a shell side outlet of the condenser 6 and the second circulating pump 302 is shared with the water supply loop 120, an outlet of the second circulating pump 302 further communicates with an inlet of the electric heater 2, an outlet of the electric heater 2 communicates with a test section second inlet 9 of the test device 10. A pipeline between the outlet of the electric heater 2 and the test section second inlet 9 is sequentially provided with a first flow meter 401, a seventh regulating valve 207, a second thermometer 602, a second pressure meter 502 and a third flow meter 403, and a pipeline between the wet steam outlet 8 of the test device 10 and the condenser 6 is shared with the water supply loop 120. Two branches are provided between the recirculated water loop 130 and the water supply loop 120. One branch of the two branches is located between a pipeline from the first flow meter 401 to the seventh regulating valve 207 in the recirculated water loop 130 and a pipeline from the fifth regulating valve 205 to the first thermometer 601 in the water supply loop 120. The one branch is provided with a check valve 206. Another branch of the two branches is located between a pipeline from the seventh regulating valve 207 to the second thermometer 602 in the recirculated water loop 130 and a pipeline from the second flow meter 402 to the test section first inlet 7 in the water supply loop 120, and the another branch is provided with an eighth regulating valve 208.

The test device 10 includes a cylindrical barrel 10-3, the wet steam outlet 8 is formed in a top of the cylindrical barrel 10-3. Two sides of a lower part of the cylindrical barrel 10-3 respectively communicate with downcomer section simulation pipes 10-2, and a bottom end of the cylindrical barrel 10-3 is connected with a detachable base 10-4. A plurality of non-uniform heat flux heating rod bundles 10-2 are arranged in the cylindrical barrel 10-3 in an axial direction. The non-uniform heat flux heating rod bundles 10-2 are divided into a left group as left rod bundles and a right group as right rod bundles, by a central divider plate 11. The left rod bundles are used for simulating the cold side of the U-shaped tube bundle in the steam generator, and the right rod bundles are used for simulating the hot side of the U-shaped tube bundle in the steam generator.

Under a condition that the check valve 206 is closed, the test loop for the steam generator with the axial economizer is provided; under a condition that the check valve 206 is open, the test loop for the steam generator without the axial economizer is provided. The eighth regulating valve 208 is used for distributing recirculated water, simulating working condition under a condition of the steam generator with the axial economizer and also participating in a function of switching the test loop.

The outlet of the third circulating pump 303 in the water supply loop 120 is provided with a bypass branch, and the bypass branch is provided with the fourth regulating valve 204.

The outlet of the first circulating pump 301 in the water supply loop 110 is provided with a bypass branch, and the bypass branch is provided with the third regulating valve 203.

Wherein the test loop is a closed loop, and air spaces are reserved in the first water tank 1 and the second water tank 4 and play a role of a pressure stabilizer.

The test method of the test loop for simulating a steam generator with or without an axial economizer includes a first test method of the test loop for the steam generator with the axial economizer and a second test method of the test loop for the steam generator without the axial economizer.

The first test method includes following steps:

1) under a condition that the central divider plate 11 in the test device 10 is not dismantled, taking the test device as a steam generator test device with the axial economizer;

2) before a test, adding water to the first water tank 1 and the second water tank 4 to guarantee that the first water tank 1 and the second water tank 4 have enough air spaces for a pressure fluctuation buffering effect, namely a pressure stabilizing effect, then opening all the regulating valves except bypasses, conducting a water adding and pressurizing test to guarantee that no leakage exists under high pressure of the test loop;

3) after pre-test work is done, closing the check valve 206 and the eighth regulating valve 208 to separate the water supply loop 120 and the recirculated water loop 130, and after pressure relief, discharging water in the test device 10;

4) fully opening the third regulating valve 203 and the fourth regulating valve 204 to keep the bypasses fully open;

5) starting the third circulating pump 303, and regulating a flow of the fourth regulating valve 204 and a flow of the fifth regulating valve 205, so that water can submerge an electric heating part in the test device 10;

6) starting the first circulating pump 301, and regulating the third regulating valve 203 and the second regulating valve 202 to maintain a preset flow, so that the cooling water loop 110 is put into operation;

7) starting the electric heating part of the test device 10, and gradually increasing electric heating;

8) after enough stable water flow exists at the outlet of the second circulating pump 302, starting the second circulating pump 302;

9) regulating the seventh regulating valve 207, starting the electric heater 2; dividing half of condensed water, heating the condensed water to be saturated; and sending the condensed water heated, back to the test section second inlet 9 to simulate the recirculated water in the steam generator;

10) after all the equipment is put into operation and stably operates for a period of time, regulating the fifth regulating valve 205, so that a liquid level in the downcomer section simulation pipes 2-2 is stabilized under a working condition needing to be simulated;

11) regulating the seventh regulating valve 207 so that a flow in the recirculated water loop 130 and a flow in the water supply loop 120 are in a certain proportion, and after stabilization, enabling a ratio of a recirculated water flow to a water supply flow to be (K−1): 1, where K is a circulation ratio in a simulated real steam generator, the recirculated water flow is measured by the first flow meter 401, and the water supply flow is measured by the second flow meter 402;

12) regulating the eighth regulating valve 208 so that the flow flowing into the test section first inlet 7 through the eighth regulating valve 208 accounts for 90% of a total flow of the recirculated water; and 13) after the test loop operates in a steady state for 20 minutes, starting to record test data of pressures, flows and temperatures.

The second test method includes following steps:
1) before a test, under a condition that the central divider plate 11 in the test device 10 is dismantled, taking the test device as a steam generator test device without the axial economizer;
2) adding water to the first water tank 1 and the second water tank 4 to guarantee that the first water tank 1 and the second water tank 4 have enough air spaces for a pressure fluctuation buffering effect, namely a pressure stabilizing effect, then opening all the regulating valves except bypasses, conducting a water adding and pressurizing test to guarantee that no leakage exists under high pressure of the test loop;
3) after pre-test work is done, closing the seventh regulating valve 207, keeping the check valve 206 and the eighth regulating valve 208 open to combine the water supply loop 120 and the recirculated water loop 130, and after pressure relief, discharging water in the test device 10;
4) fully opening the third regulating valve 203 and the fourth regulating valve 204 to keep the bypasses fully open;
5) starting the third circulating pump 303, and regulating a flow of the fourth regulating valve 204 and a flow of the fifth regulating valve 205, so that water can submerge an electric heating part in the test device 10;
6) starting the first circulating pump 301, and regulating the third regulating valve 203 and the second regulating valve 202 to maintain a preset flow, so that the cooling water loop 110 is put into operation;
7) starting the electric heating part of the test device 10, and gradually increasing electric heating;
8) after enough stable water flow exists at the outlet of the second circulating pump 302, starting the second circulating pump 302;
9) regulating the seventh regulating valve 207, starting the electric heater 2, dividing half of condensed water, heating the condensed water to be saturated; and sending the condensed water heated, back to the test section second inlet 9 to simulate the recirculated water in the steam generator;
10) after all the equipment is put into operation and stably operates for a period of time, regulating the fifth regulating valve 205, so that the liquid level in the downcomer section simulation pipes 2-2 is stabilized under a working condition needing to be simulated;
11) regulating the check valve 206 so that a flow in the recirculated water loop 130 and a flow in the water supply loop 120 are in a certain proportion, and after stabilization, enabling a ratio of a recirculated water flow to a water supply flow to be (K−1): 1, where K is a circulation ratio in a simulated real steam generator, the recirculated water flow is measured by the first flow meter 401, and the water supply flow is measured by the second flow meter 402; and
12) after the test loop operates in a steady state for 20 minutes, starting to record test data of pressures, flows and temperatures.

The test loop for simulating a steam generator with or without an axial economizer and the test method thereof integrally have the following beneficial effects.

Firstly, simulation tests can be carried out on a steam generator with or without an axial economizer. Conversion between the steam generator with an axial economizer and the steam generator without an axial economizer can be completed only by disassembling a central divider plate of a test section and adjusting loop valves, and a comparison test can be conveniently and rapidly carried out, and a new test device and a new loop do not need to be built, thereby reducing the cost greatly.

Secondly, non-uniform heat flux heating rod rods are adopted in the test section to simulate the U-shaped tube bundle in the steam generator, so that the complexity of the test loop caused by building an extra hot fluid loop is avoided, and the simulation distortion caused by using uniform heat flux heating rods is greatly reduced.

Thirdly, the test loop is simple, the construction and the maintenance are convenient, the operability is high, and the test loop and the test method can be expanded to the field of thermal-hydraulic tests of other types of steam generators containing axial economizer.

Figure 1:
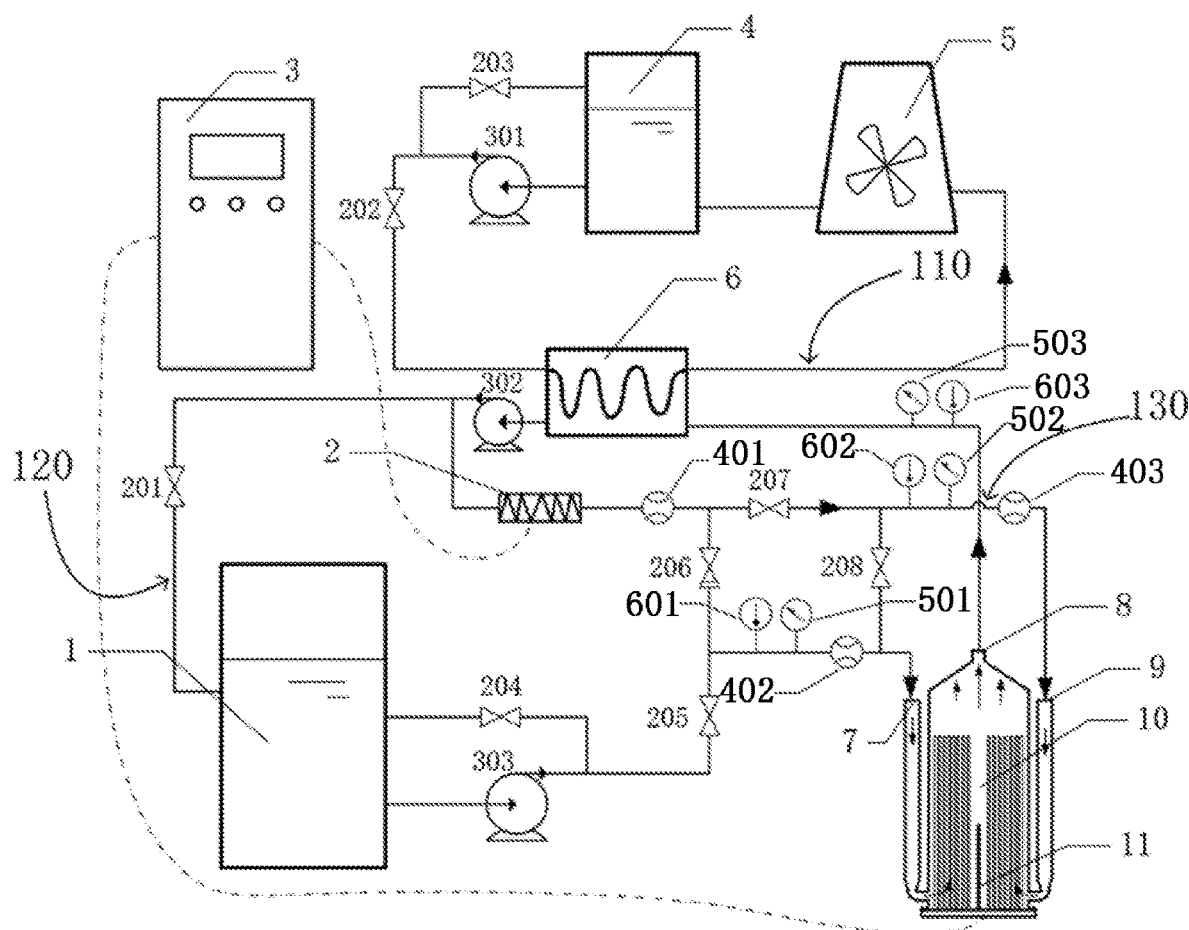
FIG. 1 is a schematic diagram of a test loop according to the present disclosure.

list of reference signs in FIG. 1: 1 first water tank; 2 electric heater; 3 power supply; 4 second water tank; 5 cooling tower; 6 condenser; 7 test section first inlet; 8 wet steam outlet; 9 test section second inlet; 10 test device for simulating steam generator with or without axial economizer; 11 central divider plate; 201 first regulating valve; 202 second regulating valve; 203 third regulating valve; 204 fourth regulating valve; 205 fifth regulating valve; 206 check valve; 207 seventh regulating valve; 208 eighth regulating valve; 301 first circulating pump; 302 second circulating pump; 303 third circulating pump; 401 first flow meter; 402 second flow meter; 403 third flow meter; 501 first pressure meter; 502 second pressure meter; 503 third pressure meter; 601 first thermometer; 602 second thermometer; 603 third thermometer; 110 cooling water loop; 120 water supply loop; and 130 recirculated water loop.

Figure 2:
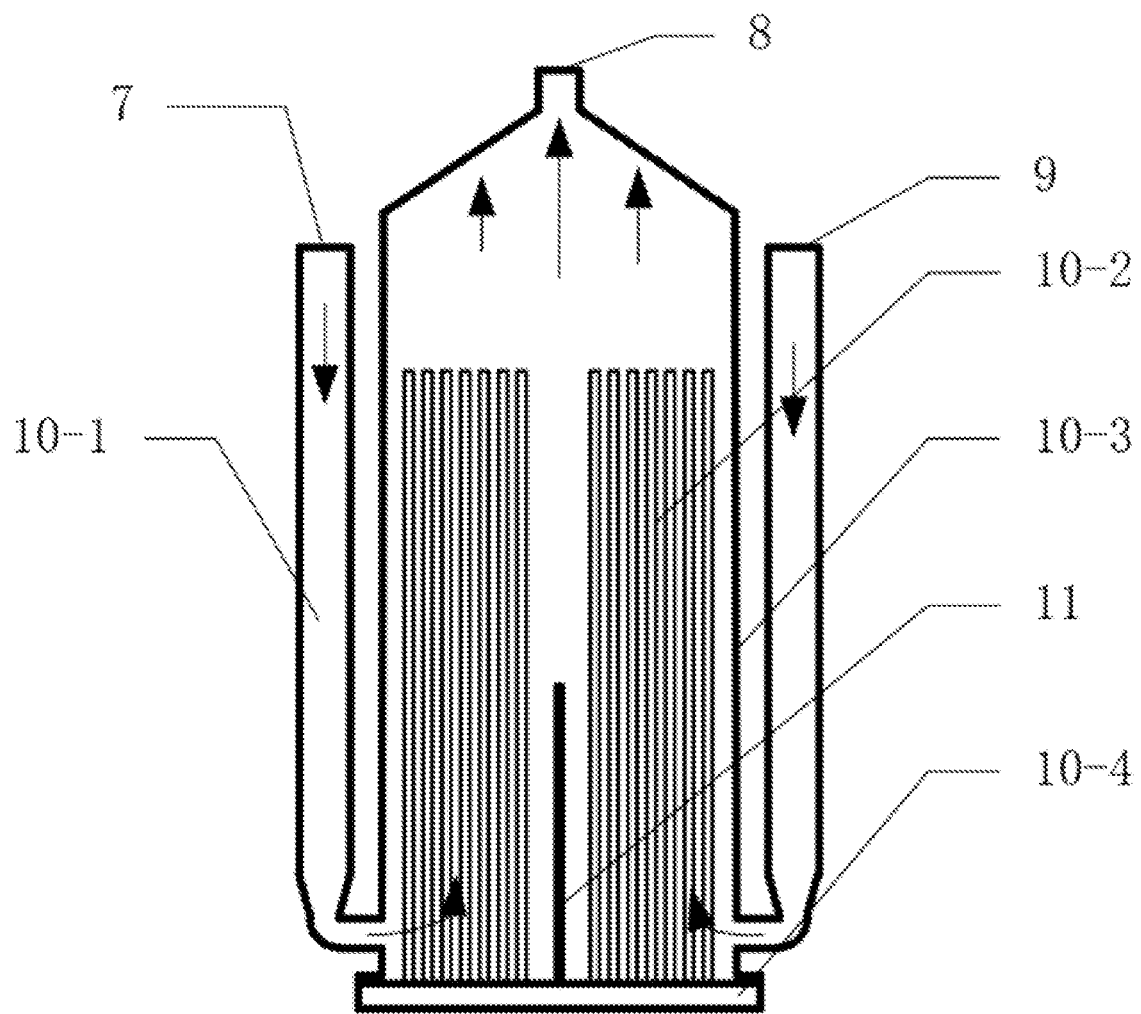
FIG. 2 is a structural schematic diagram of a test device for simulating a steam generator with or without an axial economizer.

List of reference signs in FIG. 2: 10-1 downcomer section simulation pipe; 7 test section first inlet; 8 wet steam outlet; 9 test section second inlet; 10-2 non-uniform heat flux heating rod bundle; 10-3 cylindrical barrel; 11 central divider plate; and 10-4 detachable base.

DETAILED DESCRIPTION OF THE EMBODIMENTS

In order to make the objects, technical solutions and advantages of the present disclosure clearer, the present disclosure will be described in further detail below in conjunction with the embodiments and the companying drawings, and the illustrative embodiments of the present disclosure and the description thereof are intended only to explain the present disclosure and are not intended to limit the present disclosure.

As shown in FIG. 1, the present disclosure provides a test loop for simulating a steam generator with or without an axial economizer. The test loop includes a cooling water loop 110, a water supply loop 120, a recirculated water loop 130 and a power supply 3. The cooling water loop 110 is used for condensing and cooling wet steam and providing the wet steam to the water supply loop 120 and the recirculated water loop 130, the water supply loop 120 is used for providing cold-state water supply for a test device 10 for simulating a steam generator with or without an axial economizer, the recirculated water loop 130 is used for reheating cooled water to be saturated and providing the water to the test device 10 for simulating a steam generator with or without an axial economizer, the power supply 3 is used for supplying power to heating equipment and an electric heater 2 in the test device 10 for simulating a steam generator with or without an axial economizer, and the heating equipment in the test device 10 for simulating a steam generator with or without an axial economizer includes non-uniform heat flux electric heating rods which are divided into a left group and a right group, namely a cold side group and a hot side group, and are used for simulating the hot side and the cold side of a U-shaped tube bundle in the steam generator, so that large distortion of simulation is avoided while the test loop is simplified;

The cooling water loop 110 includes a second water tank 4, a cooling tower 5, a condenser 6, a second regulating valve 202, a third regulating valve 203 and a first circulating pump 301. An outlet of the second water tank 4 communicates with the first circulating pump 301, an outlet of the first circulating pump 301 communicates with a pipe side inlet of the condenser 6, a pipeline communicating the circulating pump 301 with the condenser 6 is provided with the second regulating valve 202, a pipe side outlet of the condenser 6 communicates with an inlet of the cooling tower 5, and an outlet of the cooling tower 5 communicates with an inlet of the second water tank 4.

The water supply loop 120 includes a wet steam outlet 8, a condenser 6, a first water tank 1, a test section first inlet 7, a first regulating valve 201, a third regulating valve 203, a fourth regulating valve 204, a fifth regulating valve 205, a second circulating pump 302 and a third circulating pump 303. A shell side outlet of the condenser 6 communicates with the second circulating pump 302, an outlet of the second circulating pump 302 communicates with an inlet of the first water tank 1, a pipeline communicating the second circulating pump 302 with the first water tank 1 is provided with the first regulating valve 201, an outlet of the first water tank 1 communicates with the third circulating pump 303, an outlet of the third circulating pump 303 communicates with the test section first inlet 7 of the test device 10 for simulating a steam generator with or without an axial economizer, a pipeline communicating the third circulating pump 303 with the test section first inlet 7 is sequentially provided with a fifth regulating valve 205, a first thermometer 601, a first pressure meter 501 and a second flow meter 402. The wet steam outlet 8 at the top of the test device 10 for simulating a steam generator with or without an axial economizer communicates with a shell side inlet of the condenser 6, and a pipeline communicating the wet steam outlet 8 with the condenser 6 is provided with a third thermometer 603 and a third pressure meter 503;

The recirculated water loop 130 includes a wet steam outlet 8, a condenser 6, an electric heater 2, a test section second inlet 9, a seventh regulating valve 207 and a second circulating pump 302. A pipeline between a shell side outlet of the condenser 6 and the second circulating pump 302 is shared with the water supply loop 120, an outlet of the second circulating pump 302 further communicates with an inlet of the electric heater 2, an outlet of the electric heater 2 communicates with a test section second inlet 9 of the test device 10 for simulating a steam generator with or without an axial economizer, a pipeline between the outlet of the electric heater 2 and the test section second inlet 9 is sequentially provided with a first flow meter 401, a seventh regulating valve 207, a second thermometer 602, a second pressure meter 502 and a third flow meter 403, and a pipeline between the wet steam outlet 8 of the test device 10 for simulating a steam generator with or without an axial economizer 10 and the condenser 6 is shared with the water supply loop 120. Two branches are connected between the recirculated water loop 130 and the water supply loop 120. One branch is located between a pipeline from the first flow meter 401 to the seventh regulating valve 207 in the recirculated water loop 130 and a pipeline from the fifth regulating valve 205 to the first thermometer 601 in the water supply loop 120, and the branch is provided with a check valve 206; and the other branch is located between a pipeline from the seventh regulating valve 207 to the second thermometer 602 in the recirculated water loop 130 and a pipeline from the second flow meter 402 to the test section first inlet 7 in the water supply loop 120, and the other branch is provided with an eighth regulating valve 208.

The test device 10 for simulating a steam generator with or without an axial economizer includes a cylindrical barrel 10-3, the wet steam outlet 8 is formed at the top of the cylindrical barrel 10-3, two sides of the lower part of the cylindrical barrel 10-3 respectively communicate with downcomer section simulation pipes 10-1, and the bottom end of the cylindrical barrel 10-3 is connected with a detachable base 10-4. A plurality of non-uniform heat flux heating rod bundles 10-2 are arranged in the cylindrical barrel 10-3 in the axial direction, the non-uniform heat flux heating rod bundles 10-2 are divided into a left group and a right group by a central divider plate 11 respectively, namely left rod bundles and right rod bundles. The left rod bundles are used for simulating the cold side of the U-shaped tube bundle in the steam generator, and the right rod bundles are used for simulating the hot side of the U-shaped tube bundle in the steam generator.

Under the condition that the check valve 206 is closed, it is provided a test loop for a steam generator with an axial economizer; under the condition that the check valve 206 is open, it is provided a test loop for a steam generator without an axial economizer. The eighth regulating valve 208 is used for distributing recirculated water, simulating the working condition under the condition of a steam generator with an axial economizer and also participating in the function of switching the test loop.

Further, the outlet of the third circulating pump 303 in the water supply loop 120 is provided with a bypass branch, and the bypass branch is provided with the fourth regulating valve 204.

Further, the outlet of the first circulating pump 301 in the cooling water loop 110 is provided with a bypass branch, and the bypass branch is provided with the third regulating valve 203.

The test loop is a closed loop, and air spaces are reserved in the first water tank 1 and the second water tank 4 respectively and play a role of a pressure stabilizer.

A test method of a test loop for simulating a steam generator with or without an axial economizer includes a test method of the test loop of a steam generator with an axial economizer and a test method of the test loop of a steam generator without an axial economizer.

The test method of the test loop of a steam generator with an axial economizer includes the following steps:
under the condition that a central divider plate 11 in the test device 10 for simulating a steam generator with or without an axial economizer is not dismantled, taking the test device as a steam generator test device with an axial economizer;
before a test, adding water to the first water tank 1 and the second water tank 4 to guarantee that the first water tank 1 and the second water tank 4 have enough air spaces for a pressure fluctuation buffering effect, namely a pressure stabilizing effect, then opening all the regulating valves except bypasses, conducting a water adding and pressurizing test to guarantee that no leakage exists under high pressure of the loop;

after pre-test work is done, closing the check valve 206 and the eighth regulating valve 208 to separate the water supply loop 120 and the recirculated water loop 130, and after pressure relief, discharging water in the test device 10 for simulating a steam generator with or without an axial economizer;

fully opening the third regulating valve 203 and the fourth regulating valve 204 to keep the bypasses fully open;

starting the third circulating pump 303, and regulating the flow of the fourth regulating valve 204 and the flow of the fifth regulating valve 205, so that water can submerge an electric heating part in the test device 10 for simulating a steam generator with or without an axial economizer;

starting the first circulating pump 301, and regulating the third regulating valve 203 and the second regulating valve 202 to maintain a preset flow, so that the cooling water loop 110 is put into operation;

starting electric heating of the test device 10 for simulating a steam generator with or without an axial economizer, and gradually increasing the electric heating;

starting the second circulating pump 302, after enough stable water flow exists at the outlet of the second circulating pump 302;

regulating the seventh regulating valve 207, starting the electric heater 2, dividing half of condensed water, heating the remaining half of the condensed water to be saturated, and sending the water back to the test section second inlet 9 to simulate the recirculated water in the steam generator;

regulating the fifth regulating valve 205 after all the equipment is put into operation and stably operates for a period of time, so that the liquid level in the downcomer section simulation pipe 2-2 is stabilized under the working condition needing to be simulated;

regulating the seventh regulating valve 207 so that the flow in the recirculated water loop 130 and the flow in the water supply loop 120 are in a certain proportion, and after stabilization, enabling the ratio of the recirculated water flow to the water supply flow to be (K−1): 1, where K is the circulation ratio in the simulated real steam generator, the recirculated water flow is flow measured by the first flow meter 401, and the water supply flow is flow measured by the second flow meter 402;

regulating the eighth regulating valve 208 so that the flow flowing into the test section first inlet 7 through the eighth regulating valve 208 accounts for 90% of the total flow of the recirculated water; and starting to record test data of pressure, flow and temperature after the loop operates in a steady state for 20 minutes.

The test method of the test loop of a steam generator without an axial economizer includes the following steps:

before a test, under the condition that a central divider plate 11 in the test device 10 for simulating a steam generator with or without an axial economizer is dismantled, taking the test device as a steam generator test device without an axial economizer;

adding water to the first water tank 1 and the second water tank 4 to guarantee that the first water tank 1 and the second water tank 4 have enough air spaces for a pressure fluctuation buffering effect, namely a pressure stabilizing effect, then opening all the regulating valves except bypasses, conducting a water adding and pressurizing test to guarantee that no leakage exists under high pressure of the loop;

after pre-test work is done, closing the seventh regulating valve 207, keeping the check valve 206 and the eighth regulating valve 208 open to combine the water supply loop 120 and the recirculated water loop 130, and after pressure relief, discharging water in the test device 10 for simulating a steam generator with or without an axial economizer;

fully opening the third regulating valve 203 and the fourth regulating valve 204 to keep the bypasses fully open;

starting the third circulating pump 303, and regulating the flow of the fourth regulating valve 204 and the flow of the fifth regulating valve 205, so that water can submerge an electric heating part in the test device 10 for simulating a steam generator with or without an axial economizer;

starting the first circulating pump 301, and regulating the third regulating valve 203 and the second regulating valve 202 to maintain a preset flow, so that the cooling water loop 110 is put into operation;

starting electric heating of the test device 10 for simulating a steam generator with or without an axial economizer, and gradually increasing the electric heating;

starting the second circulating pump 302, after enough stable water flow exists at the outlet of the second circulating pump 302;

regulating the seventh regulating valve 207, starting the electric heater 2, dividing half of condensed water, heating the water to be saturated, and sending the water back to the test section second inlet 9 to simulate the recirculated water in the steam generator;

regulating the fifth regulating valve 205 after all the equipment is put into operation and stably operates for a period of time, so that the liquid level in the downcomer section simulation pipe 2-2 is stabilized under the working condition needing to be simulated;

regulating the check valve 206 so that the flow in the recirculated water loop 130 and the flow in the water supply loop 120 are in a certain proportion, and after stabilization, enabling the ratio of the recirculated water flow to the water supply flow to be (K−1): 1, where K is the circulation ratio in the simulated real steam generator, the recirculated water flow is flow measured by the first flow meter 401, and the water supply flow is flow measured by the second flow meter 402; and starting to record test data of pressure, flow and temperature after the loop operates in a steady state for 20 minutes.

The above are only the embodiments of the present disclosure and not intended to limit the patent scope of the present disclosure, and any equivalent structures or equivalent flow transformations based on the specification and the attached figures of the present disclosure, which is directly or indirectly applied in other related technical fields, shall similarly fall within the scope of patent protection of the present disclosure.

What is claimed is:

1. A test loop for simulating a steam generator with or without an axial economizer, comprising a cooling water loop, a water supply loop, a recirculated water loop and a power supply, wherein the cooling water loop is used for condensing and cooling wet steam and providing the wet steam to the water supply loop and the recirculated water loop, the water supply loop is configured for providing cold-state water to a test device for simulating the steam generator with or without an axial economizer, the recirculated water loop is configured for reheating cooled water to be saturated and providing the cooled water heated to the test device, the power supply is configured for supplying power to heating equipment in the test device, and the heating equipment in the test device comprises non-uniform heat flux electric heating rods which are divided into a left group and a right group and configured for simulating a hot side and a cold side of a U-shaped tube bundle in the steam generator;

the cooling water loop comprises a second water tank, a cooling tower, a condenser, a second regulating valve, a third regulating valve and a first circulating pump, wherein an outlet of the second water tank communicates with the first circulating pump, an outlet of the first circulating pump communicates with a pipe side inlet of the condenser, a pipeline communicating with the first circulating pump and the condenser is provided with the second regulating valve, a pipe side outlet of the condenser communicates with an inlet of the cooling tower, and an outlet of the cooling tower communicates with an inlet of the second water tank;

the water supply loop comprises a wet steam outlet, the condenser, a first water tank, a test section first inlet, a first regulating valve, a fourth regulating valve, a fifth regulating valve, a second circulating pump and a third circulating pump, wherein a shell side outlet of the condenser communicates with the second circulating pump, an outlet of the second circulating pump communicates with an inlet of the first water tank, a pipeline communicating with the second circulating pump and the first water tank is provided with the first regulating valve, an outlet of the first water tank communicates with the third circulating pump, an outlet of the third circulating pump communicates with the test section first inlet of the test device, a pipeline communicating with the third circulating pump and the test section first inlet is sequentially provided with a fifth regulating valve, a first thermometer, a first pressure meter and a second flow meter, the wet steam outlet in a top of the test device communicates with a shell side inlet of the condenser, and a pipeline communicating with the wet steam outlet and the condenser is provided with a third thermometer and a third pressure meter;

the recirculated water loop comprises the wet steam outlet, the condenser, an electric heater, a test section second inlet, a seventh regulating valve and the second circulating pump, wherein a pipeline between the shell side outlet of the condenser and the second circulating pump is shared with the water supply loop, an outlet of the second circulating pump further communicates with an inlet of the electric heater, an outlet of the electric heater communicates with the test section second inlet of the test device, a pipeline between the outlet of the electric heater and the test section second inlet is sequentially provided with a first flow meter, the seventh regulating valve, a second thermometer, a second pressure meter and a third flow meter, and a pipeline between the wet steam outlet of the test device and the condenser is shared with the water supply loop; two branches are provided between the recirculated water loop and the water supply loop, one branch of the two branches is located between a pipeline from the first flow meter to the seventh regulating valve in the recirculated water loop and a pipeline from the fifth regulating valve to the first thermometer in the water supply loop, and the one branch is provided with a check valve; and another branch of the two branches is located between a pipeline from the seventh regulating valve to the second thermometer in the recirculated water loop and a pipeline from the second flow meter to the test section first inlet in the water supply loop, and the another branch is provided with an eighth regulating valve.

2. The test loop for simulating the steam generator with or without the axial economizer according to claim 1, wherein the test device comprises a cylindrical barrel, the wet steam outlet is formed in a top of the cylindrical barrel, two sides of a lower part of the cylindrical barrel respectively communicate with downcomer section simulation pipes, and a bottom end of the cylindrical barrel is connected with a detachable base; a plurality of non-uniform heat flux heating rod bundles are arranged in the cylindrical barrel in an axial direction; the non-uniform heat flux heating rod bundles are divided into a left group as left rod bundles and a right group as right rod bundles, by a central divider plate; the left rod bundles are used for simulating the cold side of the U-shaped tube bundle in the steam generator, and the right rod bundles are used for simulating the hot side of the U-shaped tube bundle in the steam generator.

3. The test loop for simulating the steam generator with or without the axial economizer according to claim 1, wherein under a condition that the check valve is closed, the test loop for the steam generator with the axial economizer is provided; under a condition that the check valve is open, the test loop for the steam generator without the axial economizer is provided; and the eighth regulating valve is used for distributing recirculated water, simulating working condition under a condition of the steam generator with the axial economizer and also participating in a function of switching the test loop.

4. The test loop for simulating the steam generator with or without the axial economizer according to claim 1, wherein the outlet of the third circulating pump in the water supply loop is provided with a bypass branch, and the bypass branch is provided with the fourth regulating valve.

5. The test loop for simulating the steam generator with or without the axial economizer according to claim 1, wherein the outlet of the first circulating pump in the cooling water loop is provided with a bypass branch, and the bypass branch is provided with the third regulating valve.

6. The test loop for simulating the steam generator with or without the axial economizer according to claim 1, wherein the test loop is a closed loop, and air spaces are reserved in the first water tank and the second water tank and play a role of a pressure stabilizer.

7. A test method of a test loop for simulating a steam generator with or without an axial economizer, wherein the test loop for simulating the steam generator with or without the axial economizer comprises a cooling water loop, a water supply loop, a recirculated water loop and a power supply, wherein the cooling water loop is used for condensing and cooling wet steam and providing the wet steam to the water supply loop and the recirculated water loop, the water supply loop is configured for providing cold-state water to a test device for simulating the steam generator with or without an axial economizer, the recirculated water loop is configured for reheating cooled water to be saturated and providing the cooled water heated to the test device, the power supply is configured for supplying power to heating equipment in the test device, and the heating equipment in the test device comprises non-uniform heat flux electric heating rods which are divided into a left group and a right group and configured for simulating a hot side and a cold side of a U-shaped tube bundle in the steam generator;

the cooling water loop comprises a second water tank, a cooling tower, a condenser, a second regulating valve, a third regulating valve and a first circulating pump, wherein an outlet of the second water tank communicates with the first circulating pump, an outlet of the first circulating pump communicates with a pipe side inlet of the condenser, a pipeline communicating with the first circulating pump and the condenser is provided with the second regulating valve, a pipe side outlet of the condenser communicates with an inlet of the cooling tower, and an outlet of the cooling tower communicates with an inlet of the second water tank;

the water supply loop comprises a wet steam outlet, the condenser, a first water tank, a test section first inlet, a first regulating valve, a fourth regulating valve, a fifth regulating valve, a second circulating pump and a third circulating pump, wherein a shell side outlet of the condenser communicates with the second circulating pump, an outlet of the second circulating pump communicates with an inlet of the first water tank, a pipeline communicating with the second circulating pump and the first water tank is provided with the first regulating valve, an outlet of the first water tank communicates with the third circulating pump, an outlet of the third circulating pump communicates with the test section first inlet of the test device, a pipeline communicating with the third circulating pump and the test section first inlet is sequentially provided with a fifth regulating valve, a first thermometer, a first pressure meter and a second flow meter, the wet steam outlet in a top of the test device communicates with a shell side inlet of the condenser, and a pipeline communicating with the wet steam outlet and the condenser is provided with a third thermometer and a third pressure meter;

the recirculated water loop comprises the wet steam outlet, the condenser, an electric heater, a test section second inlet, a seventh regulating valve and the second circulating pump, wherein a pipeline between the shell side outlet of the condenser and the second circulating pump is shared with the water supply loop, an outlet of the second circulating pump further communicates with an inlet of the electric heater, an outlet of the electric heater communicates with the test section second inlet of the test device, a pipeline between the outlet of the electric heater and the test section second inlet is sequentially provided with a first flow meter, the seventh regulating valve, a second thermometer, a second pressure meter and a third flow meter, and a pipeline between the wet steam outlet of the test device and the condenser is shared with the water supply loop; two branches are provided between the recirculated water loop and the water supply loop, one branch of the two branches is located between a pipeline from the first flow meter to the seventh regulating valve in the recirculated water loop and a pipeline from the fifth regulating valve to the first thermometer in the water supply loop, and the one branch is provided with a check valve; and another branch of the two branches is located between a pipeline from the seventh regulating valve to the second thermometer in the recirculated water loop and a pipeline from the second flow meter to the test section first inlet in the water supply loop, and the another branch is provided with an eighth regulating valve;

wherein the test method comprises a first test method of the test loop for the steam generator with the axial economizer and a second test method of the test loop for the steam generator without the axial economizer;

the first test method comprises following steps:

under a condition that a central divider plate in the test device is not dismantled, taking the test device as a steam generator test device with the axial economizer;

before a test, adding water to the first water tank and the second water tank to guarantee that the first water tank and the second water tank have enough air spaces for a pressure stabilizing effect, then opening all the regulating valves except bypasses, conducting a water adding and pressurizing test to guarantee that no leakage exists under pressure of the test loop;

after pre-test work is done, closing the check valve and the eighth regulating valve to separate the water supply loop and the recirculated water loop, and after pressure relief, discharging water in the test device;

fully opening the third regulating valve and the fourth regulating valve to keep the bypasses fully open;

starting the third circulating pump, and regulating a flow of the fourth regulating valve and a flow of the fifth regulating valve, so that water can submerge the heating equipment in the test device;

starting the first circulating pump, and regulating the third regulating valve and the second regulating valve to maintain a preset flow, so that the cooling water loop is put into operation;

starting the heating equipment of the test device, and gradually increasing electric heating;

after stable water flow exists at the outlet of the second circulating pump, starting the second circulating pump;

regulating the seventh regulating valve, starting the electric heater; dividing half of condensed water, heating the condensed water to be saturated; and sending the condensed water heated, back to the test section second inlet to simulate the recirculated water in the steam generator;

after all the equipment is put into operation and stably operates for a period of time, regulating the fifth regulating valve, so that a liquid level in downcomer section simulation pipes is stabilized under a working condition needing to be simulated;

regulating the seventh regulating valve so that a flow in the recirculated water loop and a flow in the water supply loop are in a certain proportion, enabling a ratio of a recirculated water flow to a water supply flow to be (K−1): 1, wherein K is a circulation ratio in a simulated real steam generator, the recirculated water flow is flow measured by the first flow meter, and the water supply flow is flow measured by the second flow meter;

regulating the eighth regulating valve so that the flow flowing into the test section first inlet through the eighth regulating valve accounts for 90% of a total flow of the recirculated water; and after the test loop operates in a steady state for 20 minutes, starting to record test data of pressures, flows and temperatures; and the second test method comprises following steps:

before a test, under a condition that the central divider plate in the test device is dismantled, taking the test device as a steam generator test device without the axial economizer;

adding water to the first water tank and the second water tank to guarantee that the first water tank and the second water tank have enough air spaces for a pressure stabilizing effect, then opening all the regulating valves except bypasses, conducting a water adding and pressurizing test to guarantee that no leakage exists under pressure of the test loop;

after pre-test work is done, closing the seventh regulating valve, keeping the check valve and the eighth regulating valve open to combine the water supply loop and the recirculated water loop, and after pressure relief, discharging water in the test device;

fully opening the third regulating valve and the fourth regulating valve to keep the bypasses fully open;

starting the third circulating pump, and regulating a flow of the fourth regulating valve and a flow of the fifth regulating valve, so that water can submerge the heating equipment in the test device;

starting the first circulating pump, and regulating the third regulating valve and the second regulating valve to maintain a preset flow, so that the cooling water loop is put into operation;

starting the electric heating equipment of the test device, and gradually increasing electric heating;

after stable water flow exists at the outlet of the second circulating pump starting the second circulating pump;

regulating the seventh regulating valve, starting the electric heater, dividing half of condensed water, heating the condensed water to be saturated; and sending the condensed water heated, back to the test section second inlet to simulate the recirculated water in the steam generator;

after all the equipment is put into operation and stably operates for a period of time, regulating the fifth regulating valve, so that the liquid level in the downcomer section simulation pipes is stabilized under a working condition needing to be simulated;

regulating the check valve so that a flow in the recirculated water loop and a flow in the water supply loop are in a certain proportion, enabling a ratio of a recirculated water flow to a water supply flow to be (K−1): 1, wherein K is a circulation ratio in a simulated real steam generator, the recirculated water flow is flow measured by the first flow meter, and the water supply flow is flow measured by the second flow meter; and after the test loop operates in a steady state for 20 minutes, starting to record test data of pressures, flows and temperatures.

8. The test method of the test loop for simulating the steam generator with or without the axial economizer according to claim 7, wherein the test device comprises a cylindrical barrel, the wet steam outlet is formed in a top of the cylindrical barrel, two sides of a lower part of the cylindrical barrel respectively communicate with the downcomer section simulation pipes, and a bottom end of the cylindrical barrel is connected with a detachable base; a plurality of non-uniform heat flux heating rod bundles are arranged in the cylindrical barrel in an axial direction; the non-uniform heat flux heating rod bundles are divided into a left group as left rod bundles and a right group as right rod bundles, by the central divider plate; the left rod bundles are used for simulating the cold side of the U-shaped tube bundle in the steam generator, and the right rod bundles are used for simulating the hot side of the U-shaped tube bundle in the steam generator.

9. The test method of the test loop for simulating the steam generator with or without the axial economizer according to claim 7, wherein under a condition that the check valve is closed, the test loop for the steam generator with the axial economizer is provided; under a condition that the check valve is open, the test loop for the steam generator without the axial economizer is provided; and the eighth regulating valve is used for distributing recirculated water, simulating working condition under a condition of the steam generator with the axial economizer and also participating in a function of switching the test loop.

10. The test method of the test loop for simulating the steam generator with or without the axial economizer according to claim 7, wherein the outlet of the third circulating pump in the water supply loop is provided with a bypass branch, and the bypass branch is provided with the fourth regulating valve.

11. The test method of the test loop for simulating the steam generator with or without the axial economizer according to claim 7, wherein the outlet of the first circulating pump in the cooling water loop is provided with a bypass branch, and the bypass branch is provided with the third regulating valve.

12. The test method of the test loop for simulating the steam generator with or without the axial economizer according to claim 7, wherein the test loop is a closed loop, and air spaces are reserved in the first water tank and the second water tank and play a role of a pressure stabilizer.

\* \* \* \* \*